2,727,064

PRODUCTION OF ACETIC ACID FROM METHANOL

Edward Boaden Thomas, Thomas Hall Stothard, and Edmund Harry Alcock, Spondon, near Derby, England, assignors to British Celanese Limited, a corporation of Great Britain No Drawing. Application October 22, 1952, Serial No. 316,318

11 Claims. (Cl. 260—532)

This invention relates to the production of organic compounds and is concerned, more particularly, with the production of acetic acid by reaction between carbon monoxide and methanol.

U. S. patent application S. No. 188,481, filed October 4, 1950, now Patent No. 2,650,246 describes a process for the production of acetic acid by reaction between carbon monoxide and methanol in a reaction zone containing active carbon impregnated with nickel iodide. The said application shows how the process can be carried out continuously in the vapour phase without such loss of nickel and iodine from the reaction zone as to render the process commercially unattractive and without meeting serious difficulties due to corrosion of equipment. In this process there is, however, some loss of catalytically active material from the reaction zone in the gaseous effluent, so that for continuous operation over long periods it is necessary to provide for the supply of both nickel and iodine to the reaction zone.

According to the present invention, acetic acid is produced by a continuous process which comprises reacting carbon monoxide with methanol in the vapour phase in presence of active carbon impregnated with nickel iodide as catalyst, the carbon monoxide being passed through successive zones of active carbon and the iodine content of the catalyst being maintained by a suitable supply to the reactor, and periodically reversing the direction of flow of the reactants, the methanol being introduced so that it by-passes the first zone of active carbon in the direction of flow obtaining and the last zone of active carbon in said direction being maintained at a temperature above that at which acetic acid condenses but below the reaction temperature so that it absorbs nickel from the outgoing substances without condensation of acetic acid and, upon reversal of flow, yields nickel to the incoming gas.

It has been found that by operating in this manner it is possible with careful control of the reaction conditions to avoid the loss of nickel from the reaction zone or to reduce this loss to such very small proportions that the process can be operated continuously for several weeks without supplying nickel to the reaction zone during the process.

The reactor employed for carrying out the process of the invention may consist of a single vessel comprising a number of zones which may be separated, for example by means of grids. At each end of such a vessel there is an "end zone" of active carbon for the purpose of alternately absorbing nickel from and giving nickel up to the gas passing through the zone and, immediately beyond the first end zone in the direction of flow of the reactants and immediately in front of the second end zone, are mixing zones. The methanol is introduced into these mixing zones alternately according to the direction of flow of the reactants so as to meet and mix with the carbon monoxide being introduced through the adjacent end zone. The middle part of the vessel contains active carbon impregnated with nickel iodide and forms the reaction zone.

Provision may be made for introducing the methanol at one or more points along the reactor in addition to the points of introduction adjacent the end zones and, if desired, at each point where methanol is to be introduced, i. e. at each mixing zone, the vessel may contain a layer of inert packing material, e. g. glass or porcelain beads, pebbles or materials of higher thermal conductivity, e. g. graphite granules, so that in effect several shallow reaction zones are employed in series. 5, 10 or even more, e. g. up to 15 or 20, such shallow reaction zones may thus be employed, preferably with end zones which are of substantially greater depth than, e. g. 2 or 3 times the depth of, the individual shallow reaction zones. The depth of the end zones in relation to the total reaction zone depth depends upon the rate of passage of the reactants, the reaction conditions, and the temperature at which the end zones are maintained. The depth of each end zone may be greater than the total reaction zone depth, for instance up to twice this depth, but may be less, and satisfactory results have been obtained by using end zones each equal to a quarter of the total reaction zone depth. Where the mixing zones are constituted by layers of inert material such layers can be of much less depth than the total reaction zone depth, and where a succession of shallow reaction zones are employed can be of less depth than each such reaction zone provided they are deep enough to ensure evaporation of any liquid supplied to them and thorough admixture of the vapour formed or introduced with the reactants issuing from the preceding zone; the achievement of the latter result is much assisted by the use of efficient means for dispersing the material introduced throughout the zone.

Instead of employing a single vessel comprising a number of zones, several vessels may be employed in series, each vessel comprising one or more zones. Thus, a pair of vertical tubular vessels joined at the top may be employed so that the incoming carbon monoxide is always introduced in an upward direction and the issuing products are always taken off in a downward direction. The same result may be achieved by using a reaction vessel in the form of an inverted U. If desired, the end zones may be accommodated separately.

The reaction vessel or vessels may be jacketed and/or provided with internal tubes and means provided for circulating an attemperating medium through such jacket and tubes. In this way provision is made both for raising the temperature of the reactor when starting up the reaction as well as for effecting the cooling needed during the progress of the reaction.

When employing a number of successive reaction zones separated by mixing zones, a very effective method of providing cooling consists in supplying liquid methanol to the mixing zones. The methanol evaporates in the mixing zones, cooling the gases issuing from the immediately preceding reaction zone, so that as the reaction gases progress through the reaction vessel their temperature rises and falls as they pass successively through reaction zones and mixing zones. It is preferred to provide the feed pipes supplying the methanol with external cooling jackets reaching within a short distance of the reaction vessel, and to provide means within the reaction zones, e. g. a spray head or a spider of perforated pipes, to ensure distribution throughout the mixing zones of the methanol supplied by the feed pipes.

Provision may be made for withdrawing the reactant and product mixture from the reactor, passing it through a cooler and then returning it to the reactor, the points of exit and entry being such that the mixture thus recycled does not pass through either of the end zones. By adopting this expedient maintenance of a steady reaction temperature is possible even without any other cooling means being provided, especially if the quantity of gas recycled is large in relation to the quantity of fresh gas passed into the reactor through the end zone, e. g. more than 5 times and preferably equal to about 8 to 12 times the volume of the fresh gas. Acetic acid may, if desired, be condensed from the circulating gas before it is returned, but in this case provision must be made for reheating the gas to a temperature suitable for reintroduction, e. g. 10 to 30° C. below the desired reaction temperature.

The impregnation with nickel iodide of the active carbon employed can conveniently be carried out by soaking the active carbon in an aqueous solution of nickel iodide and drying the product until its water content is reduced to a suitable value. Generally satisfactory results are obtained using a product containing not more than 6 or 7 molecules of water per molecule of anhydrous nickel iodide, but much less water than this may be present, and if desired, a substantially anhydrous catalyst may be used. It is not necessary that the active carbon should carry a high proportion of nickel iodide, and quantities equal to ½ to 1 gram molecule of nickel iodide per litre of granular active carbon are adequate and even smaller quantities may be used. The active carbon used is preferably a highly absorptive type graded 8 to 10 mesh. The impregnated carbon granules may be diluted with a material inert to the reactants and products, especially such a material which is of good thermal conductivity, e. g. graphite granules. Usually such a diluent is not used in greater quantity than 2 or 3 parts by volume per volume of impregnated activated carbon granules.

In starting up the process carbon monoxide alone or in admixture with hydrogen, water vapour or inert gases is passed into the reaction vessel through an end zone to meet methanol introduced immediately beyond this zone. Where a succession of reaction zones are used additional methanol can be introduced into some or all of the subsequent mixing zones. The carbon monoxide may be such as to provide the theoretical quantity needed to react with all the methanol to be supplied but is preferably more than this, especially when hydrogen is present. The gas fed in may be preheated and the whole reaction vessel may be raised to a temperature suitable for initiating the reaction before any reactants are introduced. During the process the end zone being used to absorb nickel from the gas passing through it also absorbs some but not all of the iodine carried by the gas. Accordingly the iodine content of the catalyst is maintained by a suitable supply to the reactor. In practice it is preferred to introduce the iodine in the form of methyl iodide, conveniently together with the methanol.

Where the reactants pass through a succession of reaction zones methanol may be introduced at each of the mixing zones and may be supplied in liquid form to absorb heat generated in the preceding reaction zone and to provide for continuing the reaction in the succeeding zone. If desired, however, methanol may be supplied only to the earlier mixing zones, say the first third or half of the mixing zones, in quantity such that the reaction tends to fall off thereafter, this effect being assisted, if necessary, by sufficient dilution of the methanol with water. The nickel tends to travel along the reaction zones in the direction followed by the reactant stream and the site of the main reaction moves with the nickel; after a while it becomes desirable to start introducing methanol at the first zone (counting in the direction of flow) into which no methanol has so far been introduced and, at the same time, it is possible to reduce or stop the supply of methanol to the very first mixing zone. This operation can be repeated until methanol is being introduced into the mixing zone preceding the last reaction zone. It is then time to reverse the direction of flow and accordingly the direction of travel of the side of main reaction which, it will be appreciated, never occupies more than a third to half of the reaction zones. Where a single zone of active carbon impregnated with nickel iodide is employed it should be much greater in depth than is required to accommodate the side of the main reaction under the reaction conditions used, e. g. it may be 3 to 5 or more times this depth, so that most of the nickel iodide can be retained in the reaction zone and the end zones used merely for absorbing volatilised nickel which would otherwise be carried out of the reactor by the gaseous effluent. By the provision of thermo-couples the site of the main reaction can always be located, whether one or a plurality of reaction zones be employed.

Methyl iodide can be recovered from the products of the process by fractionation in quantity varying according to the reaction conditions and can be recycled. Another product of the process which can with advantage be recycled is methyl acetate. It has been found that by recycling the methyl acetate and introducing it together with methanol, the ratio of acetic acid to methyl acetate obtained in the process can be increased. As already indicated, water may also be introduced together with the methanol and, indeed, the presence of water in the reactants assists in suppressing the production of methyl acetate. However, it has been found that the introduction of large quantities of water is liable to lead to increased loss of iodine from the reaction vessel. It is usually found that the use of 5 to 10 moles of methanol, and especially about 8 moles of methanol, for each mole of water gives satisfactory results, although where methyl acetate is introduced into the reaction vessel with the methanol somewhat more water can be used, for instance an additional quantity of up to 1 mole per mole of methyl acetate thus introduced.

The temperatures and pressures employed in carrying out the process of the invention can be substantially below those usually recommended as being best for the synthesis of acetic acid from carbon monoxide and methanol and, in particular, it is preferred to use temperatures not substantially above 250° C. and pressures below 50 atmospheres. Indeed, the process can be carried out to give commercially useful conversions and yields using temperatures between 130 and 250° C. and pressures below 30 atmospheres. In general it is preferable to use temperatures in the neighbourhood of 200° C. to 230° C. at pressure of 10 to 30 atmospheres; higher outputs can be achieved at higher temperatures but it is usually best to avoid temperatures much above 260° C. Under these conditions the end zones can be maintained at temperatures within the range of 150 to 190° C.

By using low pressures low reaction temperatures can be employed without the acetic acid produced condensing in the reaction vessel. Such condensation causes severe corrosion of equipment and leads to washing of the active carbon with the condensed acid and thus removal of nickel and iodine compounds from the reaction vessel where a downwardly travelling reaction mixture is employed and refluxing of the acetic acid where an upwardly travelling reaction mixture is employed; these effects are most undesirable. Moreover, the use of low temperatures makes possible the carrying out of the process in presence of hydrogen without the excessive formation of methane which has been found to occur in the presence of hydrogen at temperatures considerably above 200° C., especially at the temperatures usually recommended for the production of acetic acid from carbon monoxide and methanol, i. e. 300 to 400° C. In this way the acetic acid can be produced directly from the products obtained by reacting carbon monoxide and hydrogen in the presence of a methanol-forming catalyst without first separating the methanol. Alternatively, the methanol can be subjected to reaction with carbon monoxide using water gas as the source of carbon monoxide, the water gas being thereby enriched in hydrogen and made suitable for subsequent use in the synthesis of methanol.

However, the invention is not limited to the use of relatively low temperatures and pressures and temperatures of up to 300 or 400° C. may be used, particularly where the process is carried out in the absence of hydrogen. Temperatures above 200° C., e. g. up to 250° or even 260° C., can be used even with hydrogen-containing reactants where the higher conversion is regarded as of sufficient value to offset the lower yield based on the methanol used which results from the greater methane formation. Pressures of more than 50 atmospheres, e. g. 100 atmospheres, and even much higher pressures, e. g. 200 or 300 atmospheres, can be used and the size of the apparatus for a given output thereby reduced but, in general, there seems to be little advantage in using very high pressures.

The contact time employed in carrying out the process of the invention can be varied within quite a wide range, and continuous operation has been carried out using contact times (based on the reactants being fed) of substantially less than 1 minute, e. g. 0.1 to 0.2 minute, although longer times, e. g. 1 to 3 minutes, are preferred and even longer times, e. g. 5 or more minutes, may be used if desired. As already indicated, the direction of flow of the carbon monoxide is repeatedly reversed during the process of the invention. With a contact time of 1 to 3 minutes at a temperature in the range 190 to 250° C. and a pressure in the range 10 to 30 atmospheres, it is preferred to reverse the flow after an interval of time of at least 2 hours, preferably after 4 to 8 hours. The size of the end zones must, of course, be related to the operating cycle so as to avoid them becoming so charged with nickel that they no longer extract it efficiently from the gases and vapours passing through them.

Under the conditions which are preferably employed for carrying out the process of the invention, i. e. at a temperature not substantially above 250° C. and a pressure below 30 atmospheres, nickel chloride and nickel fluoride and the halides of other metals, including the other iron metals, show little or no catalytic activity while only active carbon appears to be useful in the process, other substances often used as catalyst supports giving results which are useless from a commercial point of view.

The following example illustrates the invention:

*Example*

The process is carried out using an upright jacketed reactor charged with 15 three-inch deep layers of catalyst separated from each other by 14 two-inch deep layers of porcelain beads. The catalyst and bead layers (which form the reaction zones and mixing zones) are each supported on perforated baffles and the end catalyst layers are separated from 15 inch deep end zones charged with unimpregnated active carbon. Thermocouples are provided in the catalyst layers and in the end zones. The catalyst consists of active carbon granules impregnated with one mole of nickel iodide per litre of granules.

A jacketed pipe leads through the walls of the reactor into each mixing zone where it feeds a distributor arranged to disperse liquid supplied through the pipe throughout the layer of beads. The reactor is provided with means for the circulation of a heating or cooling medium.

In operation, the reactor, apart from the end zones which have separate attemperating systems, is heated to a uniform temperature of 200° C. The end zones are initially heated to 170° to 180° C. and each in turn is maintained within this temperature range throughout operation by circulating a cooling medium. When stable temperature conditions are attained a mixture of carbon monoxide and hydrogen, preheated to 200° C., is introduced through one end zone while at the same time aqueous methanol containing some methyl acetate and a little methyl iodide is introduced through the first three jacketed pipes, cooling water or brine being circulated through the jackets to keep the mixture liquid.

The temperature throughout the reactor rises somewhat, that of the first three or four reaction zones attaining a temperature of 240 to 250° C. while the rest of the reactor only attains a temperature of 220 to 230° C. or even lower. After some time the region of highest temperature starts moving in the direction of travel of the reactants and, accordingly, the jacketed feed pipes in use are from time to time altered until only the last four pipes are in use. The direction of flow should be changed before the last reaction zone rises to the highest temperature; under the conditions described reversal every five hours is satisfactory. With the change in the direction of flow the end zone at what had been the output end of the reactor is allowed to rise in temperature under the influence of the hot incoming reactants which pick up adsorbed nickel and iodine compounds; the other end zone is meanwhile cooled to 170 to 180° C. and operates at this temperature until the next flow reversal.

During the operation attemperating medium can be continuously circulated through the jacket of the reactor but the medium should be maintained at or a little below 220° C., say between 200 and 220° C.

In the event of a thermocouple showing the development of an undesirably high temperature in any particular zone, the rate of feed or content of water of the methanol fed to the preceding mixing zone is increased and likewise a fall in temperature can be corrected by a suitable reduction in the feed to that mixing zone.

The operation is carried out using a pressure of 300 lbs. per square inch and a total throughput of 44 moles of water, 17.5 of methyl acetate, 1.1 of methyl iodide, 180 to 200 of carbon monoxide and 190 to 220 of hydrogen per 100 moles of methanol supplied at a rate giving a contact time of 2 to 3 minutes based on the reactants (i. e. carbon monoxide and methanol) fed. The process can be continued for a period of more than 600 hours before the conversion of methanol to acetic acid falls below 50%, the conversion during the earlier part of the process amounting to 60 to 65%. During the 600 hours the whole of the acetic acid formed is recovered as free acetic acid but during the succeeding 100 hours a small quantity of methyl acetate is formed in addition. The yield of total acetic acid based on the methanol used falls from a value of 65% to somewhat below 50% after 700 hours.

Having described our invention, what we desire to secure by Letters Patent is:

1. A continuous process for the production of acetic acid, comprising reacting carbon monoxide with methanol in the vapour phase in presence of active carbon impregnated with nickel iodide as catalyst, the carbon monoxide being passed through successive zones of active carbon and the iodine content of the catalyst being maintained by a suitable supply to the reactor, and periodically reversing the direction of flow of the reactants, the methanol being introduced so that it by-passes the first zone of active carbon in the direction of flow obtaining and the last zone of active carbon in said direction being maintained at a temperature above that at which acetic acid condenses but below reaction temperature so that it absorbs nickel from the outgoing vapours without condensation of acetic acid and, upon reversal of flow, yields nickel to the incoming gas.

2. Process according to claim 1, wherein the iodine content of the catalyst is maintained by introducing methyl iodide recovered from the products of the reaction.

3. Process according to claim 1, wherein water is introduced into the reactor during the process.

4. Process according to claim 1, wherein methyl acetate is introduced into the reactor during the process.

5. Process according to claim 1, wherein a reaction temperature of between 200 and 260° C. is employed and a pressure of less than 50 atmospheres.

6. Process according to claim 1, wherein a reaction time of 1 to 3 minutes is employed and the direction of flow is reversed at intervals of 4 to 8 hours.

7. Process according to claim 1, wherein the reactants pass through successive zones of active carbon impregnated with nickel iodide and liquid methanol is introduced between such zones.

8. A continuous process for the production of acetic acid, comprising reacting carbon monoxide with methanol in the vapour phase in presence of active carbon impregnated with nickel iodide as catalyst, the carbon monoxide being passed through successive zones of active carbon at such a rate as to give a reaction time of 1 to 3 minutes and the iodine content of the catalyst being maintained by a suitable supply to the reactor, and reversing the direction of flow of the reactants at intervals of 4 to 8 hours, the methanol being introduced so that it by-passes the first zone of active carbon in the direction of flow obtaining and the last zone of active carbon in said direction being maintained at a temperature above that at which acetic acid condenses but below reaction temperature so that it absorbs nickel from the outgoing vapours without condensation of acetic acid and, upon reversal of flow, yields nickel to the incoming gas.

9. A continuous process for the production of acetic acid, comprising reacting carbon monoxide with methanol in the vapour phase at a temperature between 200° and 260° C. and under a pressure of less than 50 atmospheres in presence of active carbon impregnated with nickel iodide as catalyst, the carbon monoxide being passed through successive zones of active carbon at such a rate as to give a reaction time of 1 to 3 minutes and the iodine content of the catalyst being maintained by a suitable supply to the reactor, and reversing the direction of flow of the reactants at intervals of 4 to 8 hours, the methanol being introduced so that it by-passes the first zone of active carbon in the direction of flow obtaining and the last zone of active carbon in said direction being maintained at a temperature above that at which acetic acid condenses but below reaction temperature so that it absorbs nickel from the outgoing vapours without condensation of acetic acid and, upon reversal of flow, yields nickel to the incoming gas.

10. A continuous process for the production of acetic acid, comprising reacting carbon monoxide and methanol in the vapour phase at a temperature between 200° and 260° C. and under a pressure of less than 50 atmospheres in presence of water and methyl acetate and of active carbon impregnated with nickel iodide as catalyst, the carbon monoxide being passed through successive zones of active carbon at such a rate as to give a reaction time of 1 to 3 minutes and the iodine content of the catalyst being maintained by a suitable supply to the reactor, and reversing the direction of flow of the reactants at intervals of 4 to 8 hours, the methanol being introduced so that it by-passes the first zone of active carbon in the direction of flow obtaining and the last zone of active carbon in said direction being maintained at a temperature above that at which acetic acid condenses but below reaction temperature so that it absorbs nickel from the outgoing vapours without condensation of acetic acid and, upon reversal of flow, yields nickel to the incoming gas.

11. Process according to claim 10, wherein the reactants pass through successive zones of active carbon impregnated with nickel iodide and liquid methanol is introduced between such zones.

References Cited in the file of this patent

UNITED STATES PATENTS

| 2,324,746 | Weinrich et al. | July 20, 1943 |
| 2,650,246 | Thomas et al. | Aug. 25, 1953 |

FOREIGN PATENTS

| 334,189 | Great Britain | Aug. 27, 1930 |